United States Patent [19]

Loughlin et al.

[11] 3,838,444

[45] Sept. 24, 1974

[54] SYSTEM FOR TRANSMITTING AUXILIARY INFORMATION IN LOW ENERGY DENSITY PORTION OF COLOR TV SPECTRUM

[75] Inventors: Bernard D. Loughlin, Centerport; Charles E. Page, Westbury, both of N.Y.

[73] Assignee: Hazeltine Research Inc., Chicago, Ill.

[22] Filed: Oct. 30, 1972

[21] Appl. No.: 302,330

[52] U.S. Cl.......... 178/5.2 R, 178/5.6, 178/DIG. 23, 179/15 BM, 325/139

[51] Int. Cl. ............................................... H04n 7/08

[58] Field of Search............... 178/5.2 R, 5.4 R, 5.6, 178/5.8 R, 6, 6.8, DIG. 23; 179/15 BM, 15 BW; 325/139

[56] References Cited

UNITED STATES PATENTS

| | | | |
|---|---|---|---|
| 3,617,892 | 11/1971 | Hawley et al. | 325/145 |
| 2,982,813 | 5/1961 | Hathaway | 178/5.6 |
| 3,700,793 | 10/1972 | Borsuk et al. | 178/6.8 |

FOREIGN PATENTS OR APPLICATIONS

| | | | |
|---|---|---|---|
| 4,532,491 | 10/1970 | Japan | 178/DIG. 23 |

*Primary Examiner*—Robert L. Richardson
*Attorney, Agent, or Firm*—Edward A. Onders

[57] ABSTRACT

Described is a system for compatibly transmitting and receiving both a color TV signal and an add-on signal within the frequency band normally occupied by the TV signal alone. This system utilizes a high frequency-time product signal containing add-on information and having frequency components which are located in a low energy portion of the TV signal. Interference between the add-on and TV signals is minimized due to the noise-like characteristics of the high frequency-time product add-on signal and to the particular location of the add-on signal in the TV frequency band thus allowing accurate and reliable transmission of both the add-on and TV signals.

9 Claims, 5 Drawing Figures

SYSTEM FOR TRANSMITTING AUXILIARY INFORMATION IN LOW ENERGY DENSITY PORTION OF COLOR TV SPECTRUM

BACKGROUND OF THE INVENTION

This invention relates to color TV add-on systems and more particularly to those in which a color TV signal and and add-on signal are transmitted and received within the same frequency band. Such systems are highly desirable for both commercial and military applications since instead of consuming valuable and limited frequency spectrum space for the transmission of signals having a desired information content (herein called add-on signals) these systems transmit the add-on signals within the frequency band already occupied by the color TV signal alone.

In order to construct a practical add-on system of this type, interference between the add-on signal and the color TV signal must be minimized so as not to noticeably degrade the video information carried by the TV signal and yet to allow the add-on signal to be transmitted and received accurately and at a sufficiently high data rate to be useful in conveying the intended information. In the prior art such systems have employed two basic and well known techniques to achieve this objective.

The first of these prior art approaches is to time sequence the add-on information and the video information so that information containing portions of one signal never occur concurrently with information containing portions of the other. One example of this is a system wherein the add-on signal contains information which occurs only during blanking intervals of the TV signal. There are several obvious disadvantages in these time sequencing systems, the most important of which is that due to the spacing and relatively short duration of these blanking intervals the amount of add-on information that can be transmitted per unit of time (i.e., the data rate) is severely limited by the blanking interval rate. A second problem is that currently there are several other proposed uses for the vacant area in the blanking interval, any one of which if adopted may preclude this type of add-on system.

The second prior art technique involves a frequency interleaving of the add-on and TV signals, such as shown in J. L. Hathaway's U.S. Pat. No. 2,982,813. This type of system involves a signal carrier (containing sound information) located at a region in the frequency spectrum of the TV signal which is substantially unoccupied (due to the fact that the original image is periodically scanned in lines and fields, thus causing a majority of the TV signal components to be centered about harmonics of the line scanning rate with substantially unoccupied regions therebetween). This technique is complicated by the presence of the already frequency interleaved color subcarrier and by the fact that motion in the originally scanned image may cause these unoccupied regions to be occupied by TV signal components which could have interfering effects on the additional signal carrier.

The major difficulty with this type of system, as expressly stated in the Hathaway patent, is reducing the interference between the two signals. Hathaway and other systems of this type transmit their additional signal having a relatively high amplitude with respect to the TV signal components in this portion of the frequency band. This may insure reliability in the transmission of the additional signal but has the highly undesirable effect of noticeably degrading the TV signal since the high amplitude interfering signal will be visible in the displayed image. Furthermore, and also as stated in Hathaway, a lower amplitude additional signal located in this same region would be substantially obscured by the TV signal components located in this portion of the frequency band thus diminishing the accuracy and reliability with which Hathaway's additional signal could be transmitted.

It is therefore, the object of applicant's invention to overcome the aforementioned prior art problems by providing an add-on system in which the add-on signal can be accurately and compatibly transmitted and received with a color TV signal, in the frequency band normally occupied by the TV signal alone.

It is a further object of the invention to provide such a system in which add-on information contained in the add-on signal may occur concurrently with video information contained in the color TV signal without substantially degrading the video information carried by the TV signal.

It is a still further object of the invention to provide such an add-on system compatible with NTSC, PAL and SECAM type color TV systems.

In accordance with the invention there is provided a system for compatibly transmitting and receiving both a color TV signal and an add-on signal within the frequency band normally occupied by the color TV signal alone which comprises means for supplying a color TV signal occupying a predetermined frequency band and including a luminance carrier and a chrominance subcarrier, modulated with video information occurring during line intervals, the modulated carrier and subcarrier, forming areas of high energy density in first and second portions of the frequency band respectively and separated by an area of lower energy density in a third portion of the frequency band and means for generating a high frequency-time product add-on signal containing selected other information which is at least partially concurrent with the video information, the add-on signal having noise-like characteristics and having its frequency components substantially within the third portion of the frequency band. The system further provides means for transmitting, in a common medium, both the color TV and the add-on signal and means for receiving the color TV signal and the add-on signal and for detecting the add-on signal to provide an output signal primarily representative of the other information whereby mutual interference between the add-on signal and the color TV signal is minimized due to the noise-like characteristics of the add-on signal and the location of the add-on signal within the predetermined frequency band.

For a better understanding of the present invention, together with other and further objects thereof, reference is had to the following description taken in connection with the accompanying drawings and its scope will be pointed out in the appended claims.

DESCRIPTION AND OPERATION OF THE EMBODIMENTS OF FIGS. 1 AND 2

Figure 1:
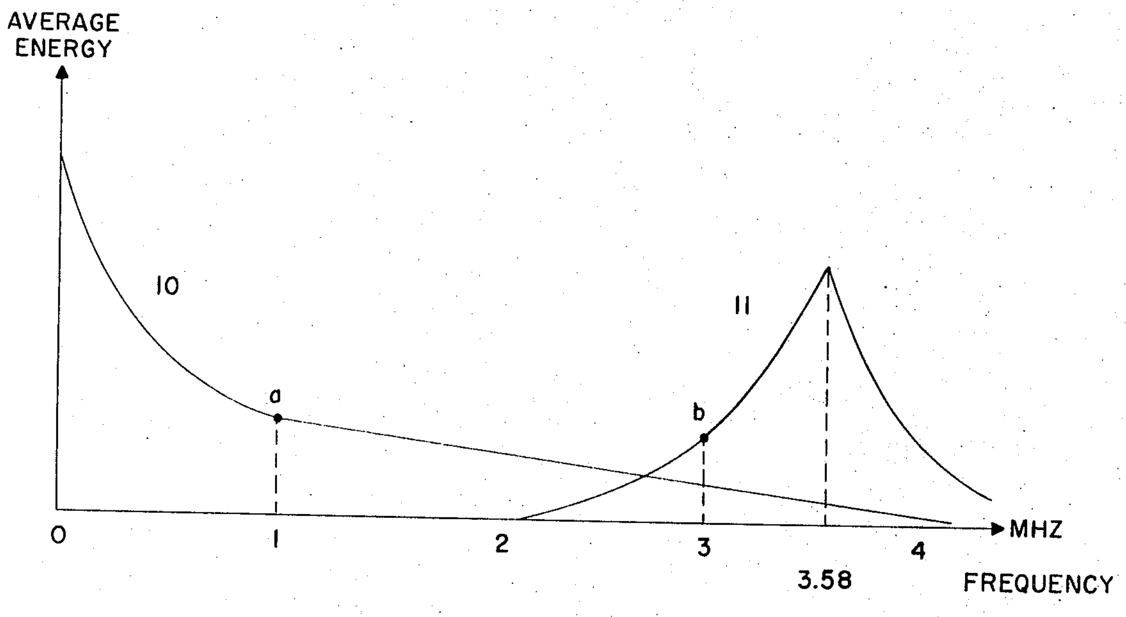
FIG. 1 is a graphical illustration which shows the energy distribution within the frequency band of a conventional color TV signal before modulation on the picture carrier.

Referring to FIG. 1 there is shown a plot of the energy distribution of a typical color TV signal such as supplied in applicant's invention. The plot shows how the energy varies over the color TV signal frequency band (typically approximately 4.25 MHz for current U.S. practice) for TV signals representing images of an average type with respect to brightness components (the overwhelming majority of all TV signals transmitted). Curve 10 shows the energy distribution caused by the luminance signal which consists of a carrier modulated by video information and which produces a region of high energy density (i.e., a region where the TV signal has many high amplitude components) in a first portion of the frequency band, namely the low frequency portion, and which tapers off as the frequency increases. Curve 11 shows the energy distribution caused by the chrominance subcarrier as modulated by video information, which produces an area of high energy density in a second portion of the frequency band, namely the portion centered about the chrominance subcarrier frequency, with the energy tapering off in both the lower and higher frequency portions of the frequency band. It will be recognized that for purposes of clarity the conventional TV signal sound carrier located somewhat above the chrominance subcarrier (about 1 MHz above in the NTSC system) is not shown in this drawing.

Between the first area of high energy density caused by the luminance signal and the second area of high energy density caused by the chrominance signal there is a third area of lower energy density, which in the illustration is substantially between points a and b on the two curves 10 and 11. It is in this area that applicant transmits his addon signal, described hereinafter, since it is in this area of the color TV signal frequency band that the lowest magnitude TV signal components occur.

It will be recognized by those skilled in the art that while the graph of FIG. 1 represents an NTSC type signal in which the color subcarrier is located approximately 3.58 MHz above the location of the luminance carrier (represented by 0 MHz on the graph but which is actually approximately 1.25 MHz above the lower boundary of the 6 MHz color TV signal frequency band in use) any comparable color TV signals which employ a luminance carrier and a chrominance subcarrier to convey video information can be used in accordance with the techings of this invention. Naturally if, as in a PAL 625 line per frame system, the location of the chrominance subcarrier is changed with respect to the luminance carrier then the low energy portion of the frequency band will be wider or narrower, corresponding to this change. The important factor in all such systems is that there is a portion of the color TV signal frequency band which has a low energy density because relatively low amplitude TV signal components usually exist at these frequencies due to the information content of images commonly transmitted.

Figure 2:
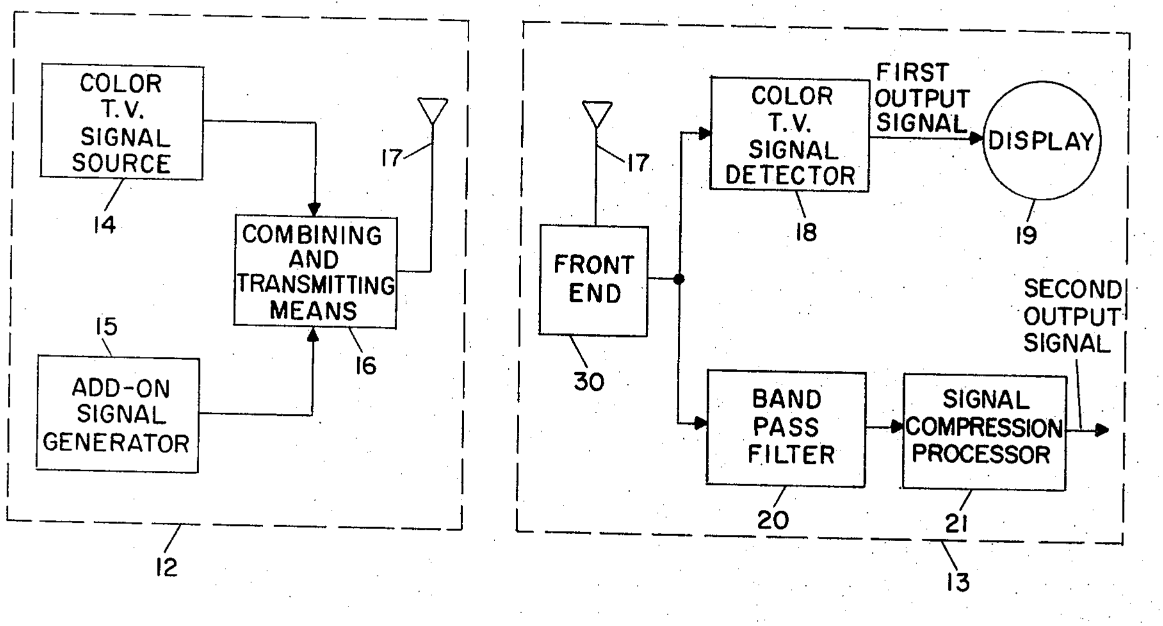
FIG. 2 is a block diagram of one embodiment of the invention showing both transmitter and receiver portions.

Turning now to FIG. 2 which illustrates an embodiment of the invention that includes a transmitter portion 12 which transmits both the add-on signal and the color TV signal over the same frequency band and in a common medium to one or more remote receivers 13. While the common medium illustrated in FIG. 2 is air as used in most commercial TV transmission, it will be recognized that any medium, such as cable, commonly used for signal transmission and reception may be substituted.

Transmitter 12 includes means 14 for supplying a color TV signal containing video information which occurs between blanking intervals, such as the one described with reference to FIG. 1. In its simplest form means 14 may be the video-frequency output of an existing color TV transmission system.

Also included in transmitter 12 is means 15 for generating a high frequency-time product add-on signal containing selected other information ("other" meaning any desired information other than the video information contained in the color TV signal, such as digital data representative of news or weather information, etc.) and having its frequency components substantially within the aforementioned third low energy portion of the frequency band. This add-on signal, which has characteristics uniquely different from TV signals, is then fed along with the supplied color TV signal to means 16 for combining and transmitting both the add-on and the TV signal in a common medium to receiver 13. Means 16 may be a single transmitter (in fact the existing color TV transmitter may be employed with simple modifications) which accepts both the add-on and the color TV signal and transmits both to receiver 13 through a common antenna 17. Alternatively, means 16 may include a pair of transmitters for individually transmitting each signal, allowing the combining to take place in the common medium (air in this case).

High frequency-time product signals and methods for generating and transmitting them are well known in the art. This type of transmission has the effect of distributing the energy over a relatively wide band of frequencies, thus permitting a comparatively low peak amplitude signal to be transmitted and received. Such signals may be developed by psuedorandom phase modulation (i.e., spread spectrum) as will be described hereinafter. Alternatively, such time dispersed wideband signals as those produced by linear or nonlinear frequency modulation and those produced by time hopping techniques may be easily adapted for use in connection with the invention. Because of the unique characteristics of these signals they can be accurately and reliably detected even in the presence of a substantial amount of interference such as that caused by the color TV signal itself. One method for generating such a signal and an especially reliable way of decoding it will be illustrated in connection with the description of FIGS. 3, 4 and 5.

Transmission of a high frequency-time product signal in the low energy portion of the TV signal frequency band is what enables applicant to overcome the difficulties exhibited by the prior art systems. First of all this signal can be made to have an amplitude which is low enough to appear as minor noise in the color TV signal and therefore will go unnoticed when the image which the TV signal is representative of is displayed. Secondly, this add-on signal can still be accurately detected because of the characteristics of high frequency-time product signals generally and because it is located in a low energy density portion of the TV signal frequency band where there are relatively few high amplitude TV signal components to interfere with its detection. Applicant can therefore transmit his add-on signal concurrently with video information in the color TV signal without interfering with this video information. Furthermore, this system can, if desired, transmit add-on information at a data rate unrelated to the TV blanking interval rate and also can, if desired, transmit add-on information solely during video intervals of the TV signal, so that still other information, for example a color test signal can be transmitted during the blanking intervals using the aforementioned prior art time sequencing technique.

In receiver 13 of the FIG. 2 embodiment, there is shown an antenna 17 and conventional receiver front end 30 which together comprises means for receiving both the add-on signal and the color TV signal. These signals may be supplied to conventional color TV signal detection circuits 18 which comprise means for detecting the color TV signal and for providing a first output signal primarily representative of the video information contained therein. This first output signal is, as is conventional in TV systems, used by display unit 19 to develop the color image which the video information in the TV signal represents. This first output signal will have components due to the add-on signal, but as previously stated these components are of a sufficiently low amplitude so as not to be noticeable in the displayed image, thus achieving one of the primary objectives of the invention. Of course, if it is desired to receive the add-on signals alone detection circuits 18 and display 19 may simply be omitted from receiver 13.

Figure 5:
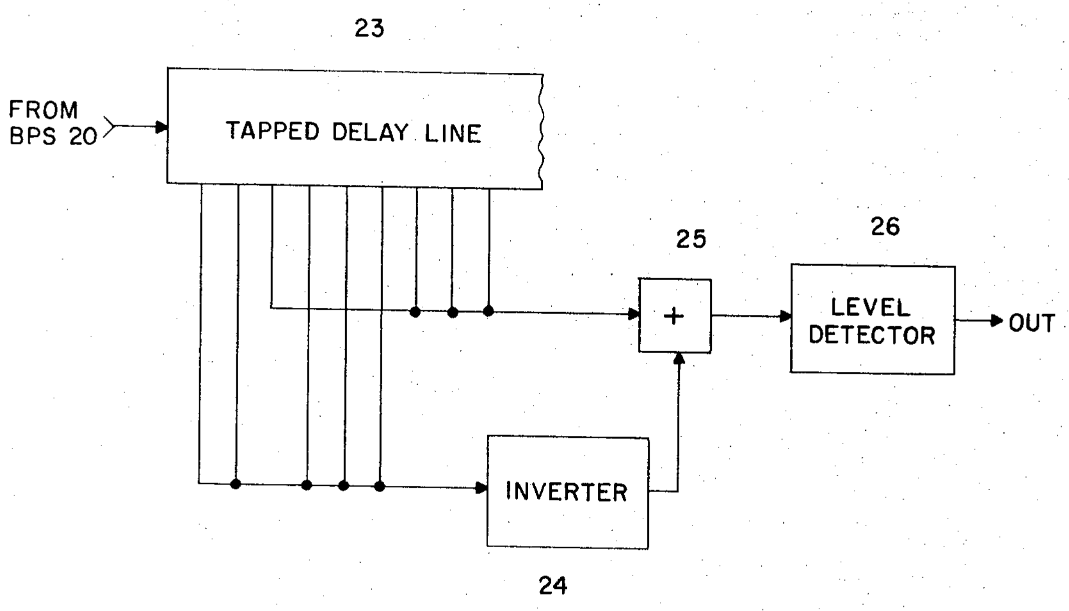
FIG. 5 is an illustration of a tapped delay line matched filter useful in the embodiment of FIG. 2.

Front end 30 also supplies both the received add-on signal and color TV signal to bandpass filter 20 whose output is connected to a signal compression processor 21; these elements, together comprise means for detecting the add-on signal and for providing a second output signal primarily representative of the add-on information. The passband of filter 20 is selected to be approximately equal to the low energy portion of the color TV signal frequency band thus filtering out extraneous high energy components of the TV signal and supplying the remaining components which include the add-on signal to signal compression processor 21 which in turn compresses the add-on signal in a manner well known in the art to obtain the second output signal. Processor 21 may provide time and/or frequency compression depending on the type of add-on signal utilized. For example, if a spread spectrum signal is transmitted processor 21 may be a matched filter as illustrated in FIG. 5. While both FIGS. 2 and 5 described hereinafter employ particular compression techniques for detecting the add-on signal it will be recognized by those skilled in the art that other high frequency-time product signal compression processors well known in the art could be substituted for the matched filter and bandpass filter illustrated herein.

DESCRIPTION AND OPERATION OF THE EMBODIMENTS OF FIGS. 3, 4 & 5

Figure 3:
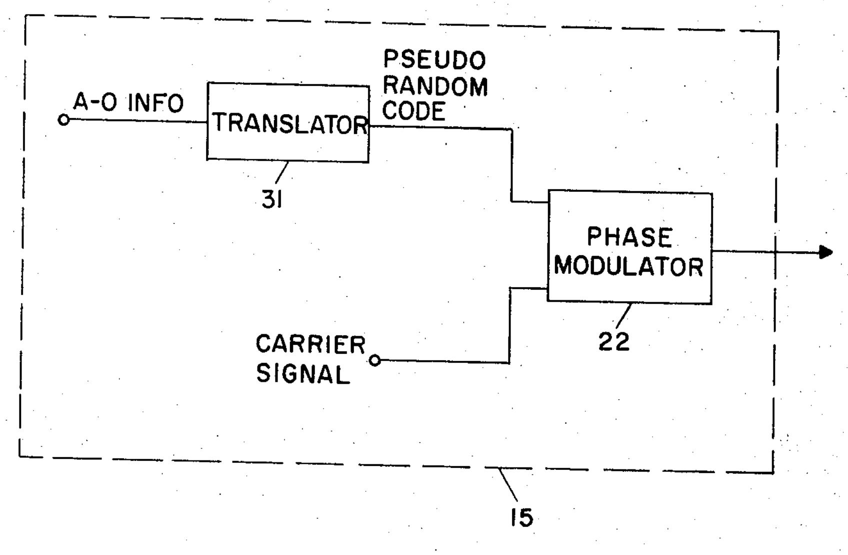
FIG. 3 is a block diagram of an add-on signal generator useful in the embodiment of FIG. 2.
Figure 4:
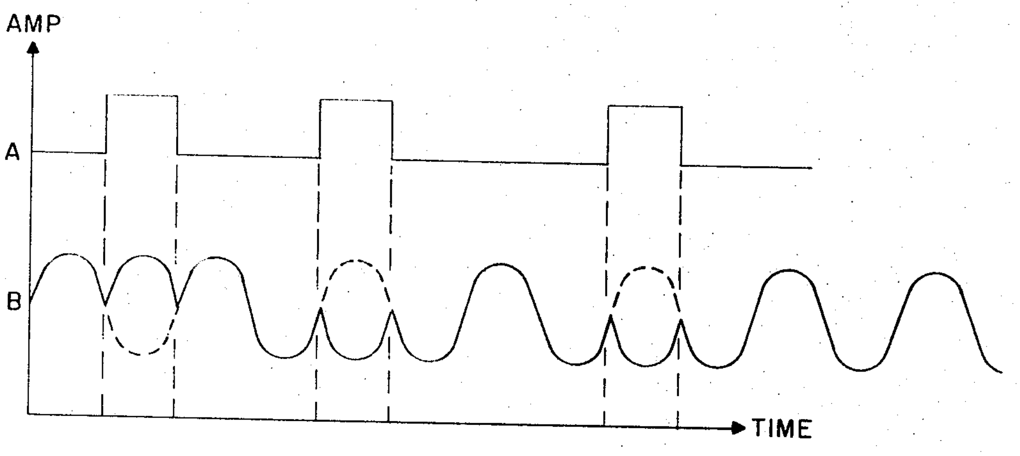
FIGS. 4*a* and 4*b* are graphical illustrations which show one type of coding useful in connection with generating high frequency-time product signals.

FIG. 3 illustrates one type of add-on signal generator 15 especially useful for generating a particular spread spectrum signal for use in the invention. This generator consists of a phase modulator 22 which is jointly responsive to a pseudorandom code modulated with the add-on information to be transmitted, such as shown by the graph of FIG. 4*a*, and to a supplied carrier signal, which may be of a frequency approximately in the center of said low energy portion of the color TV signal and of an amplitude which is relatively low with respect to the average amplitude of the color TV signal in this region. The pseudorandom code may itself be generated in any manner convenient. In the FIG. 3 embodiment translating means 31 is included which accepts the supplied add-on information and converts it into a correspondingly modulated pseudorandom code in a manner well known in the art. Phase modulator 22 changes (i.e. flips) the phase of the carrier signal a prescribed amount (usually 90° for a quadriphase modulator and 180° for a biphase modulator) in response to the leading and trailing edge of each pulse in the supplied pseudorandom code. This creates an add-on signal such as that shown in FIG. 4*b* for the case of biphase modulation (the dotted line showing positive and negative excursions of the original carrier signal) and which may be supplied to transmitter 16 for transmission to the receiver 13. It will be recognized by those skilled in the art that the graphs of FIG. 4*a* and 4*b* are presented solely by way of example and it is not necessary that the phase flipping illustrated therein take place at the point where the carrier signal crosses the horizontal axis. It will be further recognized that many other techniques for developing a high frequency-time product signals exist and may be easily substituted for that used in the FIG. 3 embodiment.

In the receiver 13 the received and bandpass filtered signal is supplied to signal compression processor 21, which may be a matched filter as previously described. The matched filter is responsive to one or more codes of the type shown in FIG. 4*b* and produces an output pulse of relatively high amplitude upon receipt of a signal representative of this code. FIG. 5 shows a tapped delay line matched filter suitable for this purpose. However it will be recognized that digital matched filters which employ integrated circuit shift registers and phase matrixes for detecting the spread spectrum signal may be employed.

The FIG. 5 matched filter includes tapped delay line 23, inverter 24, summing circuit 25, and a level detector 26. The arrangement of the taps on the delay line and selection of the taps supplied to inverter 24 are chosen to correspond to the particular pseudorandom code transmitted. In this case the taps connected to inverter 24 correspond to negative amplitude excursions in the signal of FIG. 4*b* while the taps connected directly to summer 25 correspond to the positive amplitude excursions of FIG. 4*b*. Since the inverter output is also supplied to summer 25, the output of the summer is a large pulse equal to the amplitude of the sum of all the pulses that occur in time coincidence on each of the taps of delay line 23.

From the above, it will be apparent why this type of signal is relatively immune to noise and interference which may be present in the same frequency band, since these (including the color TV signal components) have a generally random characteristic and will not be able to combine in the manner necessary at summer 25 to produce a pulse high enough to equal the threshold of level detector 25.

It will be recognized that the system described above is not limited to single channel add-on operation. Two or more pseudorandom codes and/or add-on carriers may be transmitted and the receiver may be easily adapted to receive the additional signals.

While there have been described what are at present considered to be preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for compatibly transmitting and receiving both a color TV signal and an add-on signal within the frequency band normally occupied by the color TV signal alone, comprising:

means for supplying a color TV signal occupying a predetermined frequency band and including a luminance carrier and a chrominance subcarrier, modulated with video information occurring during line intervals, said modulated carrier and subcarrier forming areas of high energy density in first and second portions of said frequency band respectively and separated by an area of lower energy density in a third portion of said frequency band;

means for generating a high frequency-time product add-on signal containing selected other information which is at least partially concurrent with said video information, said add-on signal having noise-like characteristics and having its frequency components substantially within the third portion of said frequency band;

means for transmitting, in a common medium, both said color TV signal and said add-on signal;

and means for receiving said color TV signal and said add-on signal and for detecting said add-on signal to provide an output signal primarily representative of said other information, whereby mutual interference between said add-on signal and said color TV signal is minimized due to the noise-like characteristics of said add-on signal and the location of said add-on signal within said frequency band.

2. Apparatus in accordance with claim 1 wherein said high frequency-time product add-on signal consists of a carrier signal phase modulated with a pseudorandom code representative of said selected other information and wherein said add-on signal detecting means includes a matched filter responsive to said pseudorandom code for providing said output signal.

3. Apparatus in accordance with claim 2 wherein said color TV signal is an NTSC type signal and wherein said spread spectrum add-on signal is located in the portion of the frequency band between 1.0 and 3.0 MHz.

4. Apparatus in accordance with claim 1 wherein said receiving and detecting means further comprises means for detecting said color TV signal to provide an output signal primarily representative of said video information.

5. Apparatus for compatibly transmitting both a color TV signal and an add-on signal within the frequency band normally occupied by the color TV signal alone, comprising:

means for supplying a color TV signal occupying a predetermined frequency band and including a luminance carrier and a chrominance subcarrier, modulated with video information occurring during line intervals, said modulated carrier and subcarrier forming areas of high energy density in first and second portions of said frequency band respectively and separated by an area of lower energy density in a third portion of said frequency band;

means for generating a high frequency-time product add-on signal containing selected other information which is at least partially concurrent with said video information, said add-on signal having noise-like characteristics and having its frequency components substantially within the third portion of said frequency band;

and means for transmitting in a common medium both said color TV and said add-on signals to a remote receiver whereby mutual interference between said signals is minimized due to the noise-like characteristics of said add-on signal and the location of said add-on signal within said frequency band.

6. Apparatus in accordance with claim 5 wherein said add-on signal consists of a carrier signal phase modulated with a pseudorandom code representative of said other information and suitable for decoding in a matched filter.

7. Apparatus in accordance with claim 6 wherein said color TV signal is an NTSC type signal and wherein said add-on signal is located in the portion of the frequency band between 1.0 and 3.0 MHz.

8. A receiver for use in a system wherein a color TV signal occupying a predetermined frequency band and including a luminance carrier and a chrominance subcarrier modulated with video information occuring during line intervals, thereby forming areas of high energy density in first and second portions of said frequency band separated by an area of lower energy density in a third portion of said frequency band, is compatibly transmitted with a high frequency-time product add-on signal containing selected other information which is at least partially concurrent with said video information, said add-on signal having noise-like characteristics and having its frequency components substantially within the third portion of said frequency band, said receiver comprising:

means for receiving said color TV signal and said add-on signal;

means for detecting said color TV signal to provide a first output signal primarily representative of said video information;

and means including a signal compression processor responsive to said add-on signal, for detecting said add-on signal to provide a second output signal primarily representative of said other information whereby mutual interference between said output signals is minimized due to the noise-like characteristics of said add-on signal and the location of said add-on signal within said frequency band.

9. A receiver in accordance with claim 8 wherein said transmitted add-on signal consists of a carrier signal phase modulated by a pseudorandom code representative of said other information and wherein said signal compression processor consists of a matched filter responsive to said pseudorandom code for providing said second output signal.

10. A receiver for use in a system wherein a color TV signal occupying a predetermined frequency band and including a luminance carrier and a chrominance subcarrier modulated with video information occurring during line intervals, thereby forming areas of high energy density in first and second portions of said frequency band separated by an area of lower energy density in a third portion of said frequency band, is compatibly transmitted with a high frequency time product add-on signal containing selected other information which is at least partially concurrent with said video information, said add-on signal having noise-like characteristics and having its frequency components substantially within the third portion of said frequency band, said receiver comprising:

means for receiving said add-on signal;

and means, including a signal compression processor responsive to said received add-on signal, for detecting said add-on signal to provide an output signal primarily representative of said other information.

11. A receiver in accordance with claim 10 wherein said transmitted add-on signal consists of a carrier signal phase modulated by a pseudorandom code representative of said other information and wherein said signal compression processor consists of a matched filter responsive to said pseudorandom code for providing said second output signal.

* * * * *